Oct. 10, 1950     A. A. LOMBARD     2,525,695
FLEXIBLE SHAFT COUPLING
Filed Aug. 15, 1946     2 Sheets-Sheet 1
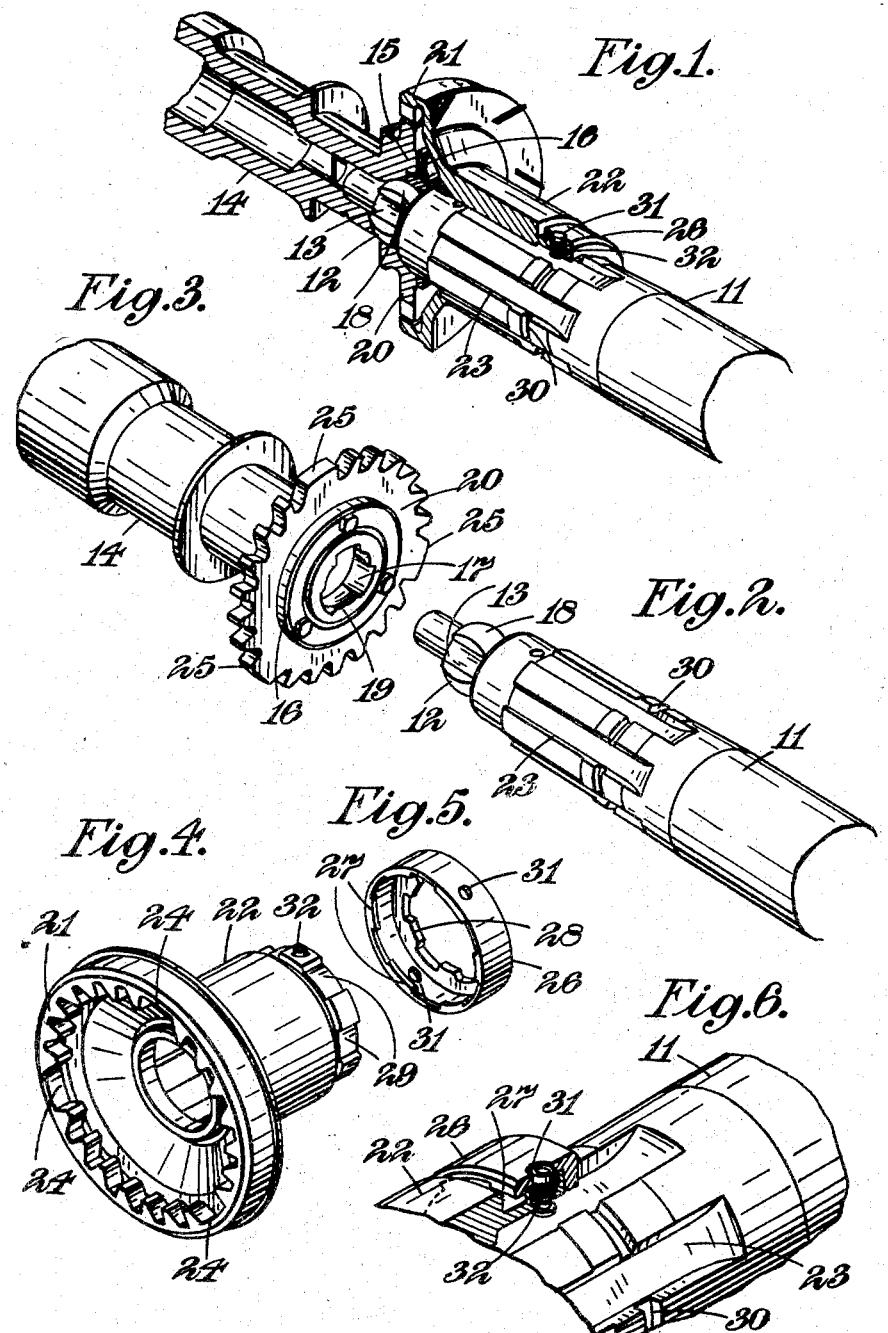
INVENTOR
ADRIAN A. LOMBARD
BY Wilkinson & Mawhinney
ATTORNEYS.

Oct. 10, 1950  A. A. LOMBARD  2,525,695
FLEXIBLE SHAFT COUPLING

Filed Aug. 15, 1946  2 Sheets-Sheet 2

INVENTOR.
A. A. LOMBARD
by Wilkinson Mawhinney
Attys.

Patented Oct. 10, 1950

2,525,695

UNITED STATES PATENT OFFICE 2,525,695

FLEXIBLE SHAFT COUPLING

Adrian Albert Lombard, Clitheroe, England, assignor to Rolls-Royce Limited, Derby, England, a British company Application August 15, 1946, Serial No. 690,722
In Great Britain January 9, 1945

Section 1, Public Law 690, August 8, 1946
Patent expires January 9, 1965

7 Claims. (Cl. 64—9)

This invention relates to shaft couplings and has for its object to provide an improved construction which in addition to transmitting a torque will also transmit end-thrust and radial loads, and which can be easily coupled and uncoupled even if it is so situated that access of a tool is difficult or impossible.

According to this invention a shaft coupling comprises an extension on one shaft having an enlargement formed with a shoulder facing the end of the shaft, an open-ended recess on the other shaft having an internal inwardly-facing shoulder, said enlargement and said shoulder being circumferentially castellated to permit the enlargement to enter the recess by axial movement of the shaft and to be rotated therein to an axially locking position, toothed driving members secured respectively on the two shafts so as to be movable into driving engagement by axial movement, means preventing such engagement except when the shafts are axially locked, and means for locking said driving members against axial disengaging movement. The enlargement and recess aforesaid are preferably co-axial with the shafts, and are respectively shaped to constitute a ball-and-socket joint.

According to another feature of this invention, the toothed driving members aforesaid may be provided with dowels to determine their relative angular disposition and permit their movement into driving engagement only in a definite position or positions. Alternatively the spacing of the intermeshing teeth on the driving members may be selected to effect a similar purpose.

A non-limitative embodiment of the invention will now be described with reference to the accompanying drawings wherein—

Figure 1 is a perspective view partly in section, of a shaft coupling constructed according to the invention.

Figure 2 shows a perspective view of one of the shafts to be coupled while Figure 3 shows a similar view of the other shaft to be coupled.

Figure 4 is a perspective view of an intermediate sleeve for interconnecting the shafts to be coupled.

Figure 5 is a perspective view of a locating ring for the intermediate sleeve.

Figure 6 is a perspective view partly in section illustrating the method of securing the locating ring to the intermediate sleeve.

Figure 7:
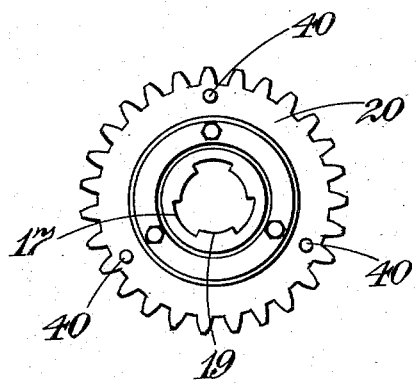
Figure 7 is a front elevational view of one of the drive members showing a modified form of aligning member constituting dowels.

In one embodiment of this invention which will now be described by way of example, it is applied to a jet engine for use in aircraft, for coupling a turbine shaft to a compressor shaft to drive it. The general design of such an engine sometimes necessitates the turbine and compressor being separated by such a distance that an additional bearing support is required about the middle of the length of the shaft and since three bearings are used, provision must be made for a small amount of mis-alignment due to distortions of the main casing which may arise. Furthermore, since the coupling is situated in the heart of the engine it is difficult of access, and it is also preferably situated in an oil-retaining chamber which has to be closed up before the coupling is finally connected.

In this particular embodiment there is secured on the end of the shaft 11 Figures 1 and 2 which constitutes one of the shafts to be coupled, an extension piece which is formed as a ball 12 co-axial with the shaft 11, and the ball is slotted or castellated longitudinally with three slots 13, each of an angular extent of 60° spaced uniformly around it. On the other shaft 14, Figures 1 and 3, there is provided a socket member 15 to receive the ball 12, and the cover-plate 16 of this socket is formed with slots 17 similarly to the ball 12 so that the ball can be inserted into the socket member by endwise movement of the shaft 11, and then when the shaft 11 is rotated through 60°, the projecting castellations 18 on the ball engage behind the corresponding projecting castellations 19 which form locking surfaces and act as an inwardly facing shoulder, and the two shafts 11 and 14 are thereby locked against axial separation. The ball-and-socket joint 12, 15 is then capable of accommodating end thrust in either direction and also radial loads.

The driving engagement between the two shafts 11 and 14 is effected by means of an externally toothed wheel 20 on the shaft 14 and an internally toothed annulus 21 formed on an intermediate sleeve 22 so as to transmit a drive between them even if a slight mis-alignment of these shafts should arise. The sleeve 22, Figures 1 and 4, is mounted on the shaft 11 which carries the ball 12 and is slidable on castellations 23 thereon which determine its angular position, relatively to the slots 13 formed on the ball 12.

Figure 8:
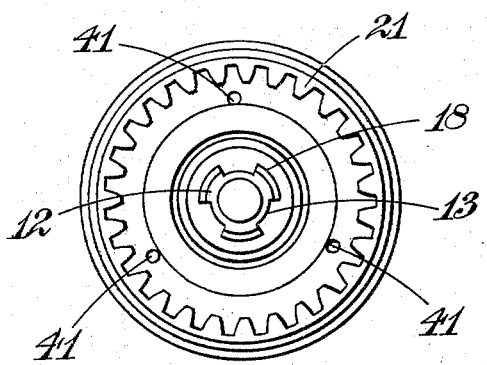
Figure 8 is a similar view of the companion drive member showing the complemental aligning member in the form of sockets.

The toothed annulus 21 on the sleeve 22 is provided with three enlarged tooth spaces 24, Figure 4, which may engage with three enlarged teeth 25 on the wheel 20 and they are located angularly so that the wheel 20 and the annulus 21 cannot be engaged with one another whilst the ball 12 is being entered into the socket member 15, but they can engage after the ball has been turned in the socket member to provide an axial locking engagement as above described. Alternatively, as shown in Figures 7 and 8, instead of the above arrangement dowel pins 40 and holes 41 may be provided on the toothed wheel 20 and on the sleeve 22 to obtain equivalent limitation of their engaging positions.

It will be seen therefore that in assembling this coupling the sleeve 22 is withdrawn along its shaft 11 and the ball 12 and socket member 15 are engaged with one another first by axial and then by rotatary movement relatively to each other of the shafts 11 and 14; thereafter the intermediate sleeve 22 can be advanced so that its toothed annulus 21 is moved into its engaging position with the wheel 20 whereby the shafts 11 and 14 are locked together angularly in the position in which the ball 13 is restrained from withdrawal from the socket member 15. The final locking of the coupling is then effected by means of a locating ring 26, Figures 5 and 6, which is formed with internal serrations 27 for engaging with the slots 29 on the sleeve 22 and which is also formed with serrations 28 for engaging with the slots of the castellations 23 on the shaft 11. The ring 26 is engaged with the sleeve 22 by passing the serrations 27 through the slots 29 and then rotating the sleeve and the ring relatively to each other; the serrations 28 which engage the slots 23 have entered a circumferential groove 30 on the shaft by this movement and the ring 26 is therefore free to turn on the shaft 11, until one of the two holes 31 on the ring registers with a spring plunger 32 carried by the sleeve. The plunger 32 then enters the hole 31 and holds the ring 26 on the sleeve 22. The sleeve 32 is thereby held against axial displacement on its shaft 11 so that a permanent coupling is ensured. The locating ring 26 is not subject to any great loads, since any end-thrust in either direction is accommodated by the ball 12 in the socket member 15 and the driving torque is transmitted through the toothed wheel 20 and the toothed annulus 21 and sleeve 22.

The shaft 11 may be connected to the turbine of the jet engine and the shaft 14 to the compressor thereof.

It will be seen that with this construction the only member which needs to be accessible is the locating ring 26 so that all the other parts of the coupling can be completely enclosed in an oil-chamber, ensuring effective lubrication. It will be appreciated also that in addition to accommodating any end-thrust, the ball 12 and socket member 15 provide a centering spigot for the shafts 11 and 14.

Instead of a ball and socket as above described, a castellated cylindrical portion may be formed on the shaft 11 and a correspondingly formed recess formed in the shaft 14, the cylindrical portion or the recess for it may be the cover plate being formed with locking surfaces which come into operation on turning the shafts after insertion of the cylindrical surface in the recess.

The angular distance between a radial slot 17 and its complemental undercut recess or projecting castellations 19 is substantially equal to the angular distance between an enlarged tooth space 24 and a complemental enlarged tooth 25 of Figures 3 and 4 in the initial position of the drive members 20, 21, such initial position being understood to be the position in which a lateral projection 18 is being axially entered through a radial slot 17 prior to its rotation into the complemental undercut recess. A complemental socket 41 and dowel pin 40 of Figures 7 and 8 is similarly angularly displaced in the initial position of the parts. This construction requires that the projection, after axial insertion through its radial slot 17, be turned completely home into the corresponding undercut recess 19 before the complemental aligning members 24, 25 or 40, 41 arrive in axial registry, which latter is the only relatively angular relationship in which the drive members 20, 21 may be axially slid into intermeshing driving engagement.

Whilst this invention has been described as applied to a jet engine it will be appreciated that it can be used for coupling any shafts in which similar conditions have to be satisfied.

I claim:

1. The combination of two shaft sections, one section having an open-ended bore, a radial slot communicating with the bore and an undercut recess angularly displaced from said slot, the other shaft section having a lateral projection receivable through said slot and seated in said undercut recess, complemental drive members fixed to rotate with said shaft sections, slide means between one of said drive members and its respective shaft section for permitting of relative axial movement of the drive members into and out of driving engagement, and complemental aligning members on the drive members interfitted in the engaged position of the drive members.

2. The combination of two shaft sections, one section having an open-ended bore, a radial slot communicating with the bore and an undercut recess angularly displaced from said slot, the other shaft section having a lateral projection receivable through said slot and seated in said undercut recess, complemental drive members fixed to rotate with said shaft sections, slide means between one of said drive members and its respective shaft section for permitting of relative axial movement of the drive members into and out of driving engagement, and complemental aligning members on the drive members interfitted in the engaged position of the drive members, said complemental aligning members angularly displaced from one another in the position of the projection as entered through the radial slot by the same angular distance between the radial slot and undercut recess, whereby the aligning members only arrive in axial registry such as to permit axial movement of the drive members into driving relation upon the full seating of the projection in the undercut recess.

3. The combination of two shaft sections, one section having an open-ended bore, a radial slot communicating with the bore and an undercut recess angularly displaced from the slot, the other shaft section having a lateral projection receivable through said slot and seated in said undercut recess, complemental drive members fixed to rotate with said shaft sections, slide means between at least one of said drive members and its associated shaft to permit of said drive members to move relatively and axially into and out of driving engagement, complemental aligning means on said drive members interfitted by said relative axial movement of the drive members in the sense of driving engagement thereof when said projection is seated in said recess.

4. The combination of two shaft sections, one section having an open-ended bore, a radial slot communicating with the bore and an undercut recess angularly displaced from said slot, the other shaft section having a lateral projection receivable through said slot and seated in said undercut recess, complemental drive members fixed to rotate with said shaft sections, slide means between at least one of said drive members and its associated shaft section to permit axial sliding movement of the drive members into and out of driving engagement, and interfitting aligning members on the drive members initially angularly displaced by substantially the same distance as that between the radial slot and undercut recess, said undercut recess and said projection having contacting relatively universally movable surfaces struck on the radius of a sphere.

5. The combination of two shaft sections, one section having an open-ended bore, a radial slot communicating with the bore and an undercut recess angularly displaced from said slot, the other shaft section having a lateral projection receivable through said slot and seated in said undercut recess, complemental drive members fixed to rotate with said shaft sections, slide means between one of said drive members and its respective shaft section for permitting of relative axial movement of the drive members into and out of driving engagement, complemental aligning members on the drive members interfitted in the engaged position of the drive members, and means for retaining the drive and aligning members in the engaged position.

6. The combination of two shaft sections, one section having an open-ended bore, a radial slot communicating with the bore and an undercut recess angularly displaced from said slot, the other shaft section having a lateral projection receivable through said slot and seated in said undercut recess, complemental drive members fixed to rotate with said shaft sections, slide means between one of said drive members and its respective shaft section for permitting of relative axial movement of the drive members into and out of driving engagement, and complemental aligning members on the drive members interfitted in the engaged position of the drive members, said aligning members comprising a circumferentially enlarged tooth on one of said drive members, the other of said drive members having a circumferentially enlarged socket complemental to said enlarged tooth for receiving the said enlarged tooth therein when said projection is seated within said undercut recess.

7. The combination of two shaft sections, one section having an open-ended bore, a radial slot communicating with the bore and an undercut recess angularly displaced from said slot, the other shaft section having a lateral projection receivable through said slot and seated in said undercut recess, complemental drive members fixed to rotate with said shaft sections, slide means between one of said drive members and its respective shaft section for permitting of relative axial movement of the drive members into and out of driving engagement, and complemental aligning members on the drive members interfitted in the engaged position of the drive members, said aligning members comprising dowel pins on one of said drive members, the other drive member having sockets complemental to said dowel pins for receiving the said pins therein when said projection is seated within said undercut recess.

ADRIAN ALBERT LOMBARD.

REFERENCES CITED

The following references are of record in the file of this patent:

UNITED STATES PATENTS

| Number | Name | Date |
|---|---|---|
| 477,625 | Detrick | June 21, 1892 |
| 2,286,862 | Livingston | June 16, 1942 |

FOREIGN PATENTS

| Number | Country | Date |
|---|---|---|
| 759,920 | France | of 1933 |